United States Patent

[11] 3,593,037

[72] Inventor Marcian E. Hoff, Jr.
Mountain View, Calif.

[21] Appl. No. 19,322
[22] Filed Mar. 13, 1970
[45] Patented July 13, 1971
[73] Assignee Intel Corporation
Mountain View, Calif.

[54] CELL FOR MOS RANDOM-ACESS INTEGRATED CIRCUIT MEMORY
12 Claims, 4 Drawing Figs.

[52] U.S. Cl. 307/238, 307/205, 307/213, 307/251
[51] Int. Cl. G11c 11/34
[50] Field of Search 307/205, 238, 251, 279, 213; 340/173

[56] References Cited

UNITED STATES PATENTS

| | | | |
|---|---|---|---|
| 3,364,362 | 1/1968 | Mellott | 307/238 X |
| 3,493,786 | 2/1970 | Attrons et al. | 307/238 |
| 3,514,765 | 5/1970 | Christensen | 307/279 X |
| 3,518,635 | 6/1970 | Cole et al. | 307/238 X |

*Primary Examiner*—John S. Heyman
*Attorney*—Spensley and Horn

ABSTRACT: A cell readily adaptable for use in a random-access integrated circuit memory which utilizes metal-oxide-semiconductors (MOS) devices is disclosed. The cell is a dynamic storage device which utilizes the parasitic capacitance associated with the lead and gate of an MOS device for storage. The cell is adaptable for use in a memory which has a separate select-write line, select-read line, write data line and read data line, and is not particularly sensitive to the signal level on these lines as are previous cells.

MARCIAN E. HOFF, JR.
INVENTOR

BY Spensley & Horn
ATTORNEYS

CELL FOR MOS RANDOM-ACESS INTEGRATED CIRCUIT MEMORY

BACKGROUND OF THE INVENTION

1. Field of the Invention

The invention relates to MOS storage devices.

2. Prior Art

The applicant is aware of at least one other dynamic storage cell which utilizes MOS devices. This cell shall be described more fully in the body of the application and its disadvantages will be enumerated. Briefly, the prior art cell utilizes a single lead for gating the reading and writing functions of the cell. The signal level on this lead must be carefully controlled in order that only a single one of these functions is selected. This limits the versatility of the cell and the speed at which it may be operated.

SUMMARY OF THE INVENTION

An MOS cell for use in a random-access integrated circuit memory is disclosed. The cell is utilized in a memory having at least four separate lines connected to each cell: select-write line, select-read line, write data line, and read data line. Three MOS devices are utilized in the cell. The first MOS device has its gate coupled to the select-write line and allows the input data to flow from the write data line onto a capacitor where it is stored. The capacitance comprises the parasitic capacitance between the lead coupling, the first MOS device with the gate of the second MOS device and the substrate upon which the cell is developed. The third MOS device has its gate coupled to the select-read line and allows the stored data to be coupled to the read data line when a signal is applied to the select-read line.

DETAILED DESCRIPTION OF THE INVENTION

In the present invention, a dynamic storage cell is disclosed wherein information is stored in a form of a charge on a capacitor. The cell is adaptable for use with a memory system or circuit which has a separate select-write line, select-read line, write data line and read data line. Typically, the charge on the capacitor is transient and must be refreshed or recharged periodically. The refreshing or recharging is often done by utilizing a one bit shift register that continuously circulates on itself. For a description of one recirculation circuit, see "MOS Random-Access Arrays," *Electronics*, Jan. 20, 1969, by Burton R. Tunzi. In the present description, the refreshing or recharging cycle will not be discussed in detail. It will be obvious to one skilled in the art that when information is read from the cells herein described, it may be recirculated and rewritten into the cell.

The MOS random-access integrated circuit memory cells described herein may utilize metal-insulator-semiconductor (MIS) or metal-oxide-semiconductor (MOS) devices, commonly known and utilized in the art. The surface field effect transistors (FET) are particularly adaptable for use in the cells herein described. For a comprehensive description of these devices, see Chapter II of *Physics and Technology of Semiconductor Devices*, A. S. Grove, published by Wiley in 1967. These devices are typically produced on either an N-type or P-type silicon substrate and each has a gate, drain and source electrode or terminal. In most MOS devices, the source and drain electrodes or terminals are interchangeable. For the purposes of this description, the source and drain electrodes shall be referred to as a first and second terminal. The MOS devices utilized in the present invention may have ordinary aluminum gates or may utilize other metals. For a general discussion on silicon-gate technology, see *IEEE Spectrum*, Oct. 1969, Pages 21—35. In the presently preferred embodiment of the present invention, a P-channel enhancement mode MOS-FET device produced on an N-type silicon substrate is utilized.

For the purposes of this description, the expression "1" or "*a* 1" when referring to a voltage which, if applied to the gate of an MOS device, is sufficient to cause the MOS device to freely conduct. It is readily apparent that the voltage may be either positive or negative depending on whether the MOS device is developed on a P-type or N-type substrate.

Figure 1:
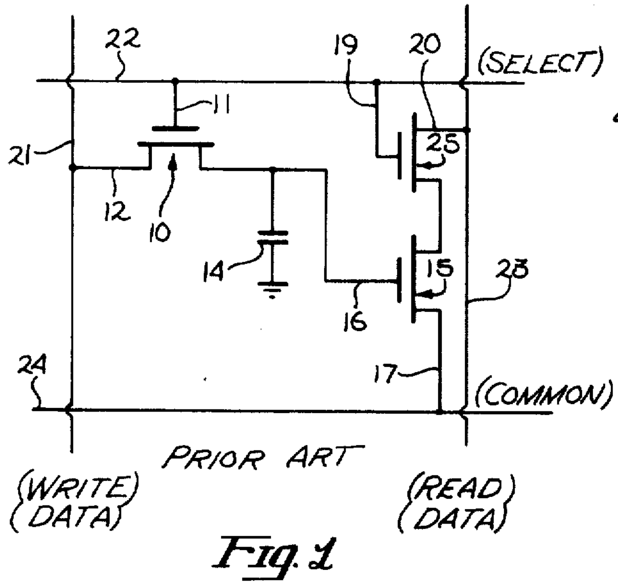
FIG. 1 illustrates a prior art integrated circuit, random-access memory cell which utilizes capacitance storage.

Referring to FIG. 1, a prior art memory cell which utilizes capacitance storage is illustrated. The cell is adaptable for use in a random-access memory circuit where the cell is coupled to a select line 22, write data line 21, read data line 23 and common line 24 of the memory circuit. In the circuit of FIG. 1, an input gating MOS device 10 has its gate 11 coupled to line 22 and one of its other two terminals coupled to line 21. The other one of its other two terminals is coupled to capacitor 14 and gate 16 of MOS device 15. MOS device 15 has one of its other terminals 17 coupled to line 24 and the other one of its other two terminals coupled to MOS device 25. MOS device 25 has its gate lead 19 coupled to line 22 and one of its other terminals coupled to line 23. The capacitance 14 is typically the parasitic capacitance associated with MOS devices 10 and 15.

In order to write information into the cell of FIG. 1, a signal is applied to line 22, causing device 10 to conduct. This allows a bit of information, if one is applied to line 21, to flow from line 21 to capacitor 14 where the information is stored in the form of a charge on capacitor 14. During the read cycle, line 23 is typically precharged to a predetermined level and the write data line 21 is precharged. (The precharging of the read data and write data lines may be done utilizing techniques and circuits commonly known and used in the art.) A signal is applied to line 22, causing MOS device 25 to discharge line 23 via line 24 if MOS device 15 is conducting. MOS device 15 will be conducting if a charge has previously been stored on capacitor 14.

The inherent problem with this cell is that the amplitude of the signal applied to line 22 during the read cycle must be carefully controlled. For example, if too large a signal is applied to line 22, it will cause MOS device 10 to conduct and possibly allow excess charge to be stored on capacitor 14. Consequently, the signals applied to line 22 must be carefully controlled in order to avoid the cell losing the stored charge. This restriction reduces the conductivity of device 25, slowing the operation of the cell.

Figure 2:
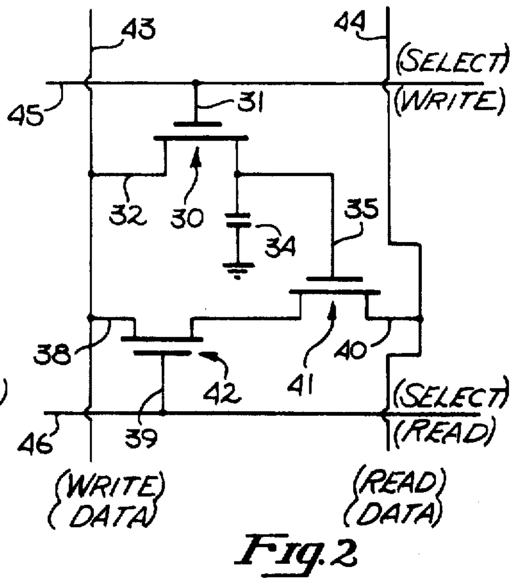
FIG. 2 illustrates an MOS random-access integrated circuit memory cell which utilizes capacitance storage constructed in accordance with the teachings of the present invention.

Referring to FIG. 2, a cell constructed in accordance with the teachings of the present invention is illustrated which is adaptable for use in a memory circuit which has a separate select-write line 45, select-read line 46, write data line 43, and read data line 44. A first MOS device 30 having a gate 31 and two other terminals has its gate 31 coupled to line 45 and one of its other terminals 32 coupled to line 43. The other of its other terminals is coupled to capacitor 34 and the gate 35 of MOS device 41. MOS device 41 which has a gate 35 and two other terminals has one of its other terminals 40 coupled to line 44 and the other of its other terminals coupled to one of the other terminals of MOS device 42. MOS device 42 which has a gate 39 coupled to line 46 and two other terminals, one of which, terminal 38, is coupled to line 43. The entire cell may be readily produced on an N-type or P-type silicon substrate, utilizing commonly known photofabrication techniques. The capacitor 34 may be the parasitic capacitance between MOS devices 30 and 41 and the substrate upon which the cell is fabricated. It is readily apparent that a plurality of the cells, such as the one illustrated in FIG. 2, may be readily developed on a single substrate to form a random-access memory circuit. Each additional row of cells requires another pair of select lines, and each additional column of cells requires another pair of data lines.

To write or to store information on the cell of FIG. 2, the data to be stored is placed on the write data line 43 and a 1 is applied to select write line 45. When this occurs, charge from line 43 will flow through terminal 32 onto capacitor 34 since MOS device 30 is conducting.

Information may be read from the cells in two different methods. In the first method, line 44 is held at ground and the write data line 43 is precharged to a 1. A 1 is applied to the select read line 46. If a charge has been previously stored on capacitor 34, the write line 43 is then discharged, since both MOS devices 41 and 42 will conduct. If no charge exists on capacitor 34, MOS device 41 will not conduct and no charge is removed from the write data line 43. Note that the inverse of the data stored on capacitor 34 is sensed by this method. As previously mentioned, this data, when read from the cell, may be applied to a refresh amplifier. This refresh amplifier must invert the data and replace it on the write data line 43 where it may be rewritten into the cell.

Secondly, the data may be read from the cell by precharging line 44 to ground, then placing a 1 on the write data line 43 and a 1 on the select read line 46. If a charge is stored on capacitor 34, it may be sensed on line 44 since MOS devices 41 and 42 will conduct and line 44 will be charged. If no charge is stored on capacitor 34, line 44 will not be charged since MOS device 41 will not conduct. Once again, the signal read on line 44 may be recirculated and replaced on capacitor 34. The second method of reading information from the cell of FIG. 2 does not require the select-read line 46 to be completely returned to a zero or no signal level before the write cycle begins.

Figure 3:
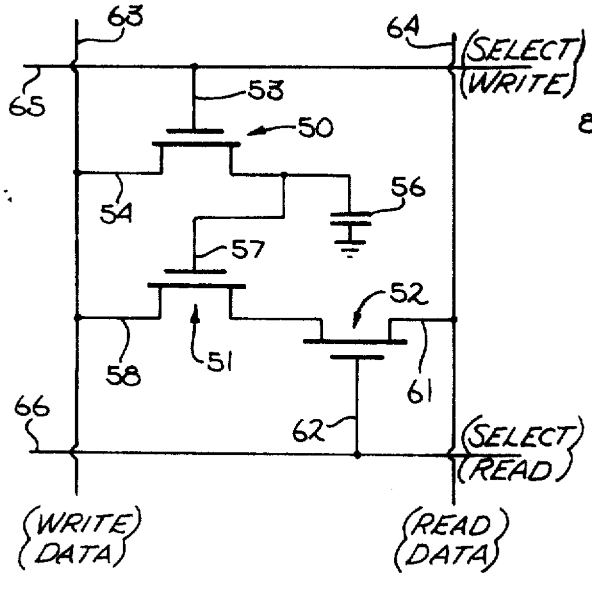
FIG. 3 illustrates an alternate embodiment of the cell illustrated in FIG. 2; and, FIG. 4 illustrates an alternate embodiment of the cell described in FIG. 3 wherein a common or ground line is utilized.

FIG. 3 illustrates an alternate embodiment of the circuit illustrated in FIG. 2 and where the cell is coupled to select-write line 65, select-read line 66, write data line 63, and read data line 64. This cell again utilizes three MOS devices 50, 51 and 52. The gate 53 of MOS device 50 is coupled to line 65 and one of its other terminals 54 is coupled to line 63. The other of its other terminals is coupled to capacitor 56 and the gate 57 of MOS device 51. One of the other terminals 58 of the MOS device is coupled to line 63 and the other of the other terminals is coupled to one of the other terminals of the MOS device 52. The gate 62 of MOS device 52 is coupled to line 66 and the other terminal 61 of the other terminals of MOS device 52 is coupled to line 64. Once again, the capacitor 56 may be the parasitic capacitance inherent between MOS devices 50 and 51 and the substrate. The construction and method of operation of the embodiment of the memory cell disclosed in FIG. 3 may be the same as the construction and method of operation of the cell previously described in conjunction with FIG. 2.

Figure 4:
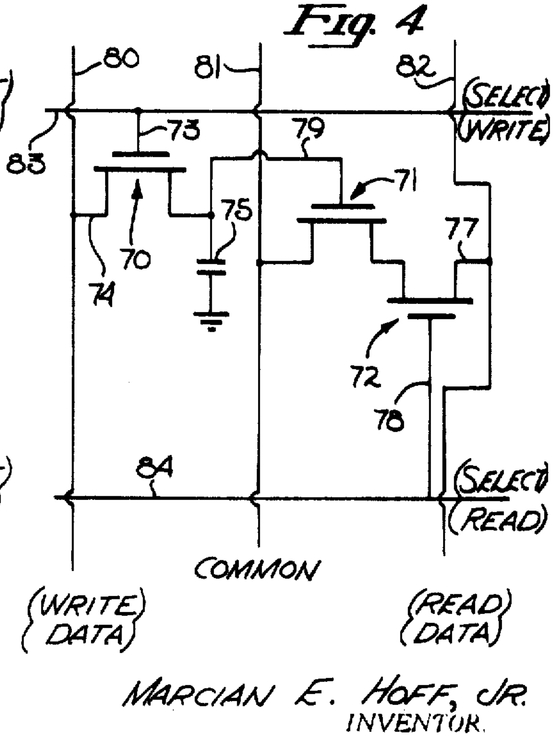

FIG. 4 illustrates still another embodiment of the present invention wherein a common line or ground line 81 is utilized. The cell illustrated in FIG. 4 is coupled to the select-write line 83, the select-read line 84, the write data line 80 and the read data line 82. MOS device 70 which performs the same function as MOS devices 50 and 30 of FIGS. 3 and 2, respectively, and has its gate terminal 73 coupled to line 83. One of its other terminals 74 is coupled to line 80 and the other of its other terminals is coupled to capacitor 75 and the gate 79 of MOS device 71. One of the other terminals of the MOS device 71 is coupled to line 81 while the other of the other terminals of the device is coupled to one of the terminals of the MOS device 72. The other terminal 77 of the terminals of the MOS device 72 is coupled to line 82; the gate 78 of the MOS device 72 is coupled to line 84. The capacitance 75 may again be the inherent parasitic capacitance between MOS devices 70 and 71 and the substrate upon which the cell is developed. The construction of the cell illustrated in FIG. 4 may be similar to the construction of the cell illustrated in FIG. 2.

With the embodiment of the invention illustrated in FIG. 4, data is written into the cell by placing a 1 on select-write line 83 and by applying the data to the write data line 80. The 1 on line 83 which is applied to the gate 73 of MOS device 70 will cause the device to conduct and allow the data to be written onto capacitor 75. To read information from the cell, the read data line 82 is precharged to a 1 and a 1 is applied to the select-read line 84. The line 82 will sense the inverse of the data stored on capacitor 75. If a 1 is stored on capacitor 75, the charge on line 82 will discharge through ground line 81 since MOS devices 71 and 72 will conduct. If no charge exists on capacitor 75, then the precharge will remain on line 82 since MOS device 71 will not conduct. This embodiment of the present invention allows exceptionally fast reading and writing.

Thus, a random-access memory cell comprising an integrated circuit which utilizes MOS devices has been disclosed. Separate select-write, select-read, write data, and read data lines are utilized, thereby allowing the cell to be somewhat insensitive to the signal levels applied to these lines.

I claim:

1. A cell for an MOS random-access integrated circuit memory which utilizes at least a separate select-read, select-write, write, and read lines comprising:
   - a capacitor adaptable for storing an electrical charge;
   - a first MOS device coupled to said select-write line, said write line and said capacitor for allowing a current to flow between said capacitor and said write line when a predetermined signal is applied to said select-write line;
   - a second MOS device coupled to said capacitor, said select-read line and said read line for allowing a current to flow through said device when said capacitor is charged; and
   - a third MOS device coupled to said capacitor, said second MOS device and said select-read line for allowing a current to flow through said device when a predetermined signal is applied to said select-read line;
   - whereby a bit of information may be selectively stored or written onto said capacitor and selectively read from said capacitor.

2. The cell defined in claim 1 wherein said first and second MOS devices are connected to one another and said capacitor is the parasitic capacitance between said connection and a substrate supporting the cell.

3. The cell defined in claim 2 wherein said substrate is an N-type silicon and said devices are a P-channel enhancement mode MOS-FET devices.

4. A cell for an MOS random-access integrated circuit memory which utilizes a separate select-read, select-write, read data and write data lines comprising:
   - a capacitor adaptable for storing an electrical charge;
   - a first MOS device having a gate and at least two other terminals, said gate lead coupled to said select-write line, one of said other terminals coupled to said write data line and the other of said other terminals coupled to said capacitor;
   - a second MOS device having a gate and at least two other terminals, said gate coupled to said capacitor, one of said other terminals coupled to said read data line; and,
   - a third MOS device having a gate and at least two other terminals, said gate coupled to said select-read line, one of said other terminals being coupled to said write data line and the other of said other terminals coupled to the other of said other terminals of said second MOS device.

5. The cell defined in claim 3 wherein said other of said other terminals of said first MOS device is connected to said gate of said second MOS device and said capacitor is the parasitic capacitance between said connection and a substrate supporting said cell.

6. The cell defined in claim 5 wherein said substrate is an N-type silicon and said devices are a P-channel enhancement mode MOS-FET devices.

7. A cell for an MOS random-access integrated circuit memory which utilizes a separate select-read, select-write, write data and read data lines comprising:

- a capacitor adaptable for storing an electrical charge;
- a first MOS device having a gate and at least two other terminals, said gate terminal coupled to said select-write line, one of said other terminals coupled to said write data line and the other of said other terminals coupled to said capacitor;
- a second MOS device having a gate and at least two other terminals, and gate terminal coupled to said capacitor and one of said other terminals coupled to said write data line; and
- a third MOS device having at least a gate and two other terminals, said gate terminal being coupled to said select-read line, one of said other terminals being coupled to said read date line and the other of said other terminals being coupled to the other of said other terminals of said second MOS device.

8. The cell defined in claim 7 wherein said other of said other terminals of said first MOS device is connected to said gate of said second MOS device and said capacitor is the parasitic capacitance between said connection and a substrate supporting the cell.

9. The cell defined in claim 8 wherein said substrate is an N-type silicon and said devices are a P-channel enhancement mode MOS-FET devices.

10. A cell for an MOS random-access integrated circuit memory which utilizes a separate select-read, select-write, read data, write data and common lines comprising:

- a capacitor adaptable for storing an electrical charge;
- a first MOS device having a gate and at least two other terminals, said gate terminal coupled to said select-write line, one of said other terminals coupled to said write data line and the other of said other terminals coupled to said capacitor;
- a second MOS device having a gate and at least two other terminals, said gate terminal coupled to said capacitor and one of said other terminals coupled to said common line; and,
- a third MOS device having at least a gate and two other terminals, said gate terminal coupled to said select-read line, one of said other terminals coupled to said read data line and the other of said other terminals coupled to said other of said other terminals of said second MOS device.

11. The cell defined in claim 10 wherein said other of said other terminals of said first MOS device is connected to said gate of said second MOS device and said capacitor is the parasitic capacitance between said connection and a substrate supporting the cell.

12. The cell defined in claim 11 wherein said substrate is an N-type silicon and said devices are P-channel enhancement mode MOS-FET devices.

Notice of Adverse Decision in Interference

In Interference No. 97,911, involving Patent No. 3,593,037, M. E. Hoff, Jr., CELL FOR MOS RANDOM-ACCESS INTEGRATED CIRCUIT MEMORY, final judgment adverse to the patentee was rendered June 7, 1974, as to claim 1.

[*Official Gazette October 1, 1974.*]